US008167376B2

(12) United States Patent
Song

(10) Patent No.: US 8,167,376 B2

(45) Date of Patent: May 1, 2012

(54) CAR SEAT HEADREST MOUNTING STRUCTURE

(75) Inventor: Byeong Rock Song, Incheon (KR)

(73) Assignee: DDD Co., Ltd, Chungcheong Namdo (KR)

( * ) Notice: Subject to any disclaimer, the term of this patent is extended or adjusted under 35 U.S.C. 154(b) by 228 days.

(21) Appl. No.: 12/523,994

(22) PCT Filed: Jan. 15, 2008

(86) PCT No.: PCT/KR2008/000253

§ 371 (c)(1), (2), (4) Date: Mar. 15, 2010

(87) PCT Pub. No.: WO2008/091072

PCT Pub. Date: Jul. 31, 2008

(65) Prior Publication Data

US 2010/0164271 A1 Jul. 1, 2010

(51) Int. Cl.
*A47C 7/36* (2006.01)

(52) U.S. Cl. .................................... 297/410; 297/217.3

(58) Field of Classification Search .................. 297/410, 297/217.3

See application file for complete search history.

(56) References Cited

U.S. PATENT DOCUMENTS 6,217,118 B1 * 4/2001 Heilig .......................... 297/410
6,607,242 B2 8/2003 Estrada et al.
7,097,242 B2 8/2006 Farquhar et al.
7,677,910 B2 * 3/2010 Yoshida et al. ............... 439/246
7,753,708 B2 * 7/2010 Yoshida et al. ............... 439/345
2002/0093231 A1 7/2002 Estrada et al.
2004/0155496 A1 8/2004 Farquhar et al.
2006/0220434 A1 * 10/2006 Schulz et al. ................. 297/410
2010/0127542 A1 * 5/2010 Nishiura et al. ........... 297/217.3

FOREIGN PATENT DOCUMENTS

KR 10-2006-0107096 A 10/2006

* cited by examiner

*Primary Examiner* — Anthony D Barfield

(74) *Attorney, Agent, or Firm* — Christopher Paul Mitchell

(57) ABSTRACT

A headrest apparatus for vehicle seats. The headrest apparatus includes coupling holders, a support, a headrest, and an actuating unit. The headrest apparatus further includes a connector body mounted outside any one of the coupling holders, and configured to have guide rails that extend from the connector body in the ascending and descending direction of the support; a slider coupled to the connector body so as to be moved along the guide rails; and connectors configured to be respectively mounted to a lower end of the support and the slider, to be coupled to or separated from each other according to the ascent and descent of the support, and to be respectively connected with the power line, which is connected to the actuating unit of the headrest, and the power line, which is connected to the power supply unit of the vehicle via the seat main body.

7 Claims, 4 Drawing Sheets

[Fig. 1]
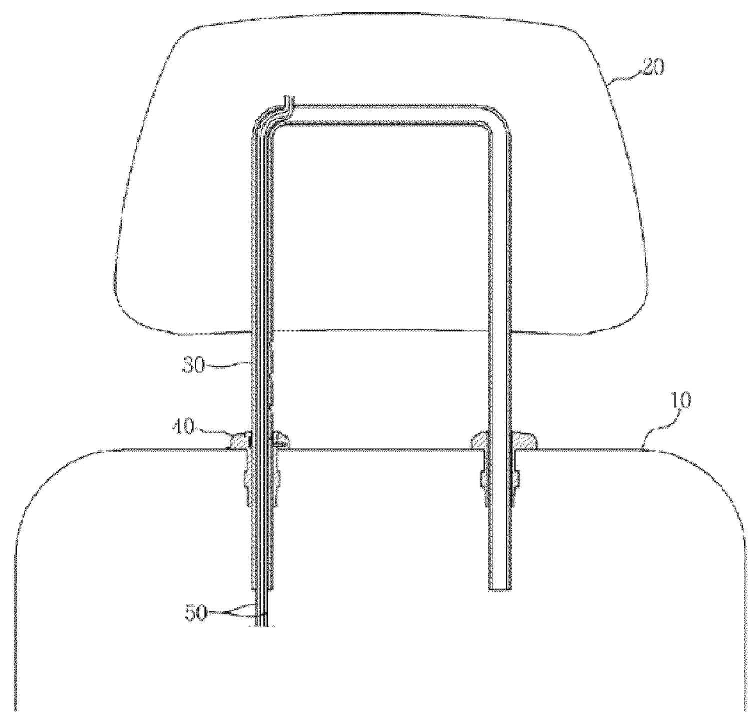
[Fig. 2]
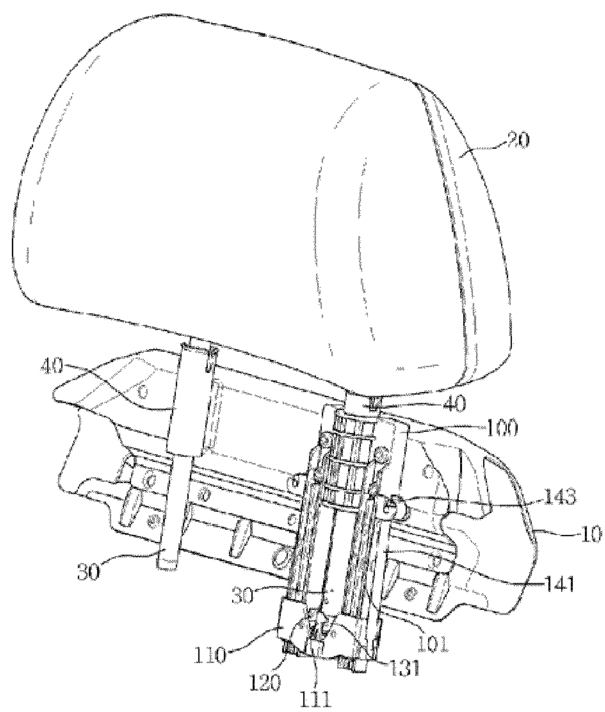

[Fig. 3]
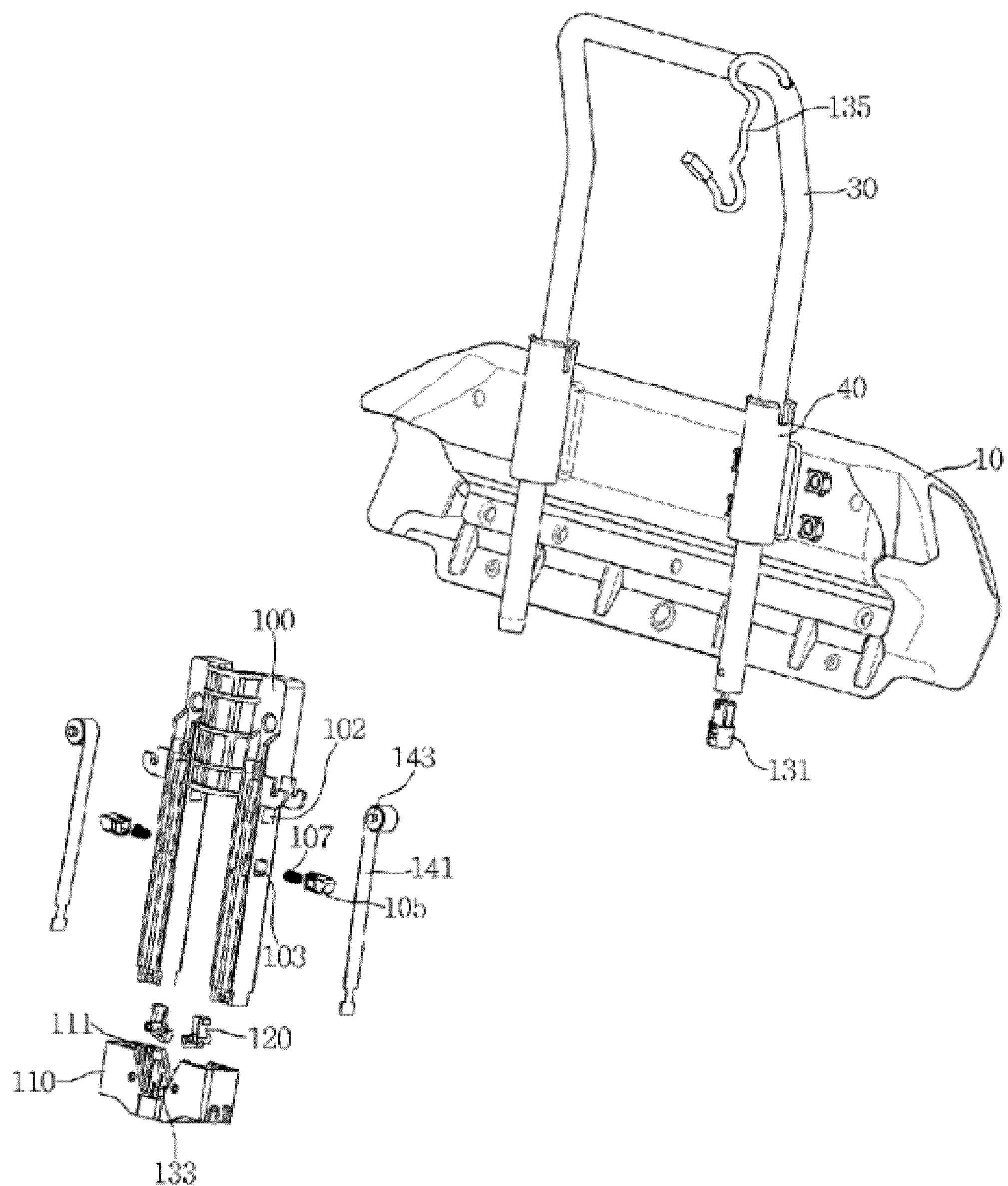

[Fig. 4]
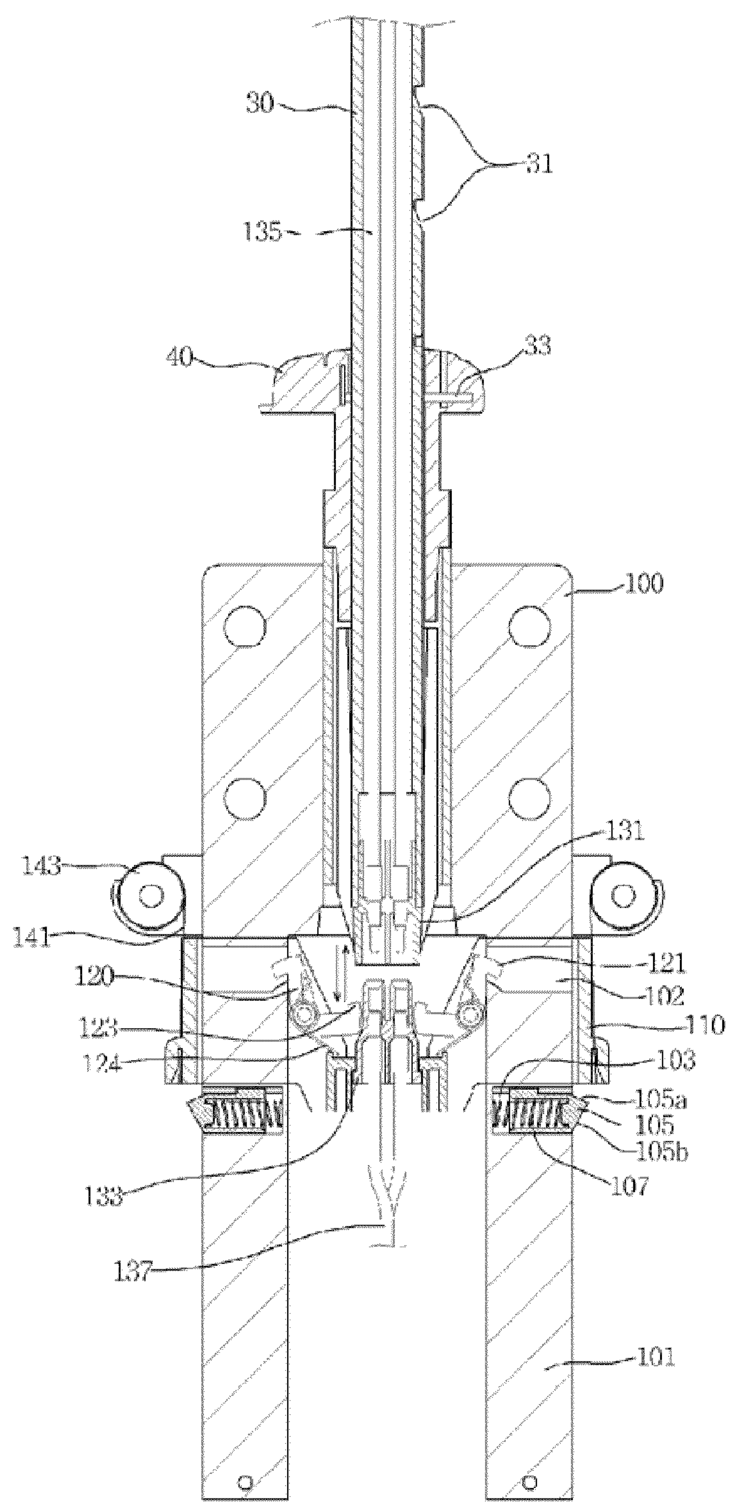

[Fig. 5]
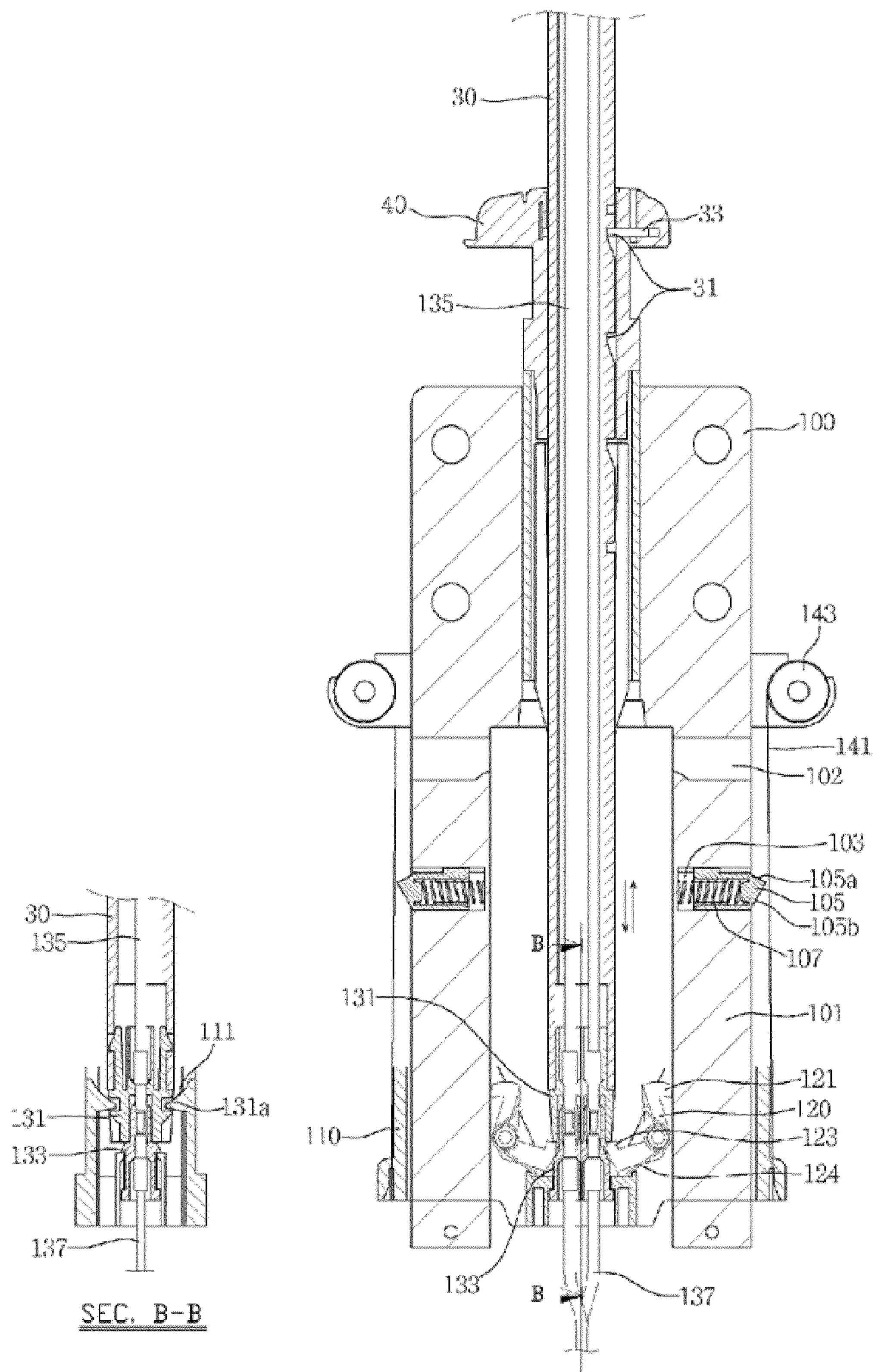

CAR SEAT HEADREST MOUNTING STRUCTURE

RELATED APPLICATIONS

This application is a 371 application of International Application No. PCT/KR2008/000253, filed Jan. 15, 2008, which in turn claims priority from Korean Patent Application No. 10-2007-0008346, filed Jan. 26, 2007, both of which are incorporated herein by reference.

TECHNICAL FIELD

The present invention relates to a headrest apparatus that is mounted to a vehicle seat and, more particularly, to a headrest apparatus for vehicle seats, which enables a headrest to be both mechanically and electrically coupled to or separated from a seat main body.

BACKGROUND ART

Generally, a headrest for supporting a passenger's head to increase safety and comfort is mounted to a seat, which is installed in a vehicle. In particular, deluxe vehicles have recently been designed and manufactured to have a structure in which various conveniences are provided in order to provide various additional functions, in addition to a simple function of enabling a headrest to support the passenger's head. For example, in order to minimize the impact that occurs when the neck of the passenger is pulled back in the event of a rear-end collision or a head-on collision, an active headrest apparatus, which is configured such that a headrest, which operates in conjunction with a seat, is moved forwards and supports the passenger's neck, is employed. Furthermore, a display device is installed in the rear portion of a front seat headrest, so that rear seat passengers can view broadcasts, and an apparatus for electrically adjusting the height and angle of a headrest is also employed.

When various additional conveniences are provided as described above, power lines, which are used to supply power to the actuating units of a headrest, are disposed in a seat main body. The conventional headrest apparatus for vehicle seats, described above, is schematically shown in FIG. 1.

As shown in the drawing, a pair of coupling holders 40 is fixedly mounted in a seat main body 10, the side portions of a support 30, which is coupled to a headrest 20, are inserted into respective coupling holders 40 so as to be moved upwards and downwards, and power lines 50, which extend from the seat main body 10 to the headrest 20, are disposed in the support 30.

The above-described headrest apparatus is configured such that the height of the headrest 20 can be appropriately adjusted by raising and lowering the support 30 through the coupling holders 40, and the headrest 20 can be mechanically separated by pulling the support 30 out of the coupling holders 40.

However, in the conventional headrest apparatus, the power lines 50 are disposed in the support 30, as shown in the drawings, and thus the headrest 20 can be coupled to or separated from the seat main body 10 only after the disposed lines are handled, that is, the conventional headrest apparatus has a structure in which the headrest 20 and the seat main body 10 cannot be mechanically and electrically coupled to each other in a single step. Accordingly, when it is required to repair and replace the headrest 20 itself, or various actuating units, which are provided in the headrest 20, there are problems in that it is very inconvenient to separate or couple the headrest 20, and in that it takes a lot of time.

Furthermore, in the same manner as in a process of manufacturing seats, when the seat main body 10 and the headrest 20 are assembled with each other, the mechanical and electrical coupling must be accomplished through individual tasks, so that there are problems in that it is inconvenient to conduct work, and in that productivity is lowered.

DISCLOSURE OF INVENTION

Technical Problem

Accordingly, the present invention has been proposed to solve the above-above problems, and an object of the present invention is to provide a headrest apparatus for vehicle seats, which enables a headrest to be mechanically and electrically coupled to or separated from a seat main body in a single step, thus not only increasing productivity in a process of assembling vehicle seats but also facilitating the work of repairing or replacing the headrest.

Technical Solution

In order to accomplish the above object, the present invention provides a headrest apparatus for vehicle seats, including coupling holders coupled to a seat main body of a vehicle, a support coupled to the upper portion of the seat main body so as to be raised and lowered through the coupling holders, a headrest coupled to the upper portion of the support, and an actuating unit provided in the headrest and connected to the power supply unit of the vehicle via power lines to perform a predetermined function, wherein the headrest apparatus further includes: a connector body mounted outside any one of the coupling holders, and configured to have guide rails that extend from the connector body in the ascending and descending direction of the support; a slider coupled to the connector body so as to be moved along the guide rails; and connectors configured to be respectively mounted to a lower end of the support and the slider, to be coupled to or separated from each other according to the ascent and descent of the support, and to be respectively connected with the power line, which is connected to the actuating unit of the headrest, and the power line, which is connected to the power supply unit of the vehicle via the seat main body.

The headrest apparatus may further include locking holes respectively formed in guide rails of the connector body, lockers provided with respective locking protrusions, which are coupled in the slider so as to be rotated and are inserted into the respective locking holes according to a location of the slider, thus providing fastening force, and springs configured to elastically support the respective lockers such that the locking protrusions are inserted into the locking holes.

In this case, it is preferred that the lockers have respective support protrusions that are configured to come into contact with and support the connector of the support.

Furthermore, the headrest apparatus further may include latch holes respectively formed in the guide rails of the connector body, and latches mounted in the respective latch holes so as to be elastically moved by springs, wherein each of the latches has upper and lower inclined surfaces so that the slider is stopped or pass therethrough using lifting force applied by the slider.

In this case, it is preferred that, of the inclined surfaces of each of the latches, the upward inclined surface be formed to have a slope close to horizontal, thus providing a relatively strong stopping force when the slider, which is positioned in the upper portion of the guide rails, is moved downwards.

More preferably, the headrest apparatus may further include rollers mounted to the connector body, and windup springs coupled with the rollers to be wound thereto and configured such that the lower ends thereof are connected to the slider, wherein upward movement force that is generated by the windup springs is applied to the slider.

Furthermore, the headrest apparatus may further include a locking groove formed in the outer surface of the connector of the support, and a locking hook hooked in the locking groove when the connectors are connected to the slider, thus providing locking force.

Advantageous Effects

According to the present invention, a connector is provided in a lower end of the support of the headrest, and an actuation type connector, which is connected to the connector, is provided in the seat main body, so that, when the support is merely inserted into or pulled out of the coupling holders of the seat main body, the head rest can be mechanically and electrically coupled to or separated from the seat main body in the same step, with the result that, in a process of manufacturing vehicle seats, in the headrests of which electrical actuating units are provided, the work of repairing and replacing actuating units, which are provided in a headrest, as well as the work of assembling headrests can be rapidly and conveniently conducted.

Furthermore, the location of the connector of the seat main body is maintained close to the entry location of the connector of the headrest, and the connector of the entering headrest is elastically supported, so that the coupling between the two connectors can be accurately made without being misaligned, and also can be gently made without any impact, and damage to the connectors, attributable to a collision, can be prevented.

Furthermore, the slider, in which the connector of the seat main body is mounted, is supported by the locking protrusions and the latches, which are mounted to the guide rails, so as to be stopped until a force that is equal to or greater than a force having a predetermined magnitude is applied thereto, or after a force has been applied thereto for longer than a predetermined period of time, so that the coupling between the two connectors is made at the early stage of entry of the support and, in addition, the slider is supported by the windup springs while receiving the upward elastic force, with the result that the accuracy of coupling between the two connectors and the convenience of work can be further improved.

BRIEF DESCRIPTION OF THE DRAWINGS

FIG. 1 is a view showing the internal construction of a conventional headrest apparatus for vehicle seats;

FIG. 2 is a perspective view showing an embodiment of a headrest apparatus for vehicle seats according to the present invention;

FIG. 3 is an exploded perspective view showing the headrest apparatus according to the present invention, shown in FIG. 2; and FIGS. 4 and 5 are views showing the operation of the headrest apparatus according to the present invention, shown in FIG. 2.

BEST MODE FOR CARRYING OUT THE INVENTION

The present invention provides a headrest apparatus for vehicle seats, coupling holders (40) coupled to a seat main body (10) of a vehicle, a support (30) coupled to the upper portion of the seat main body (10) so as to be raised and lowered through the coupling holders (40), a headrest (20) coupled to the upper portion of the support (30), and an actuating unit provided in the headrest (20) and connected to the power supply unit of the vehicle via power lines to perform a predetermined function, wherein the headrest apparatus further comprises: a connector body (100) mounted outside any one of the coupling holders (40), and configured to have guide rails (101) that extend from the connector body (100) in the ascending and descending direction of the support (30); a slider (110) coupled to the connector body (100) so as to be moved along the guide rails (101); and connectors (131, 133) configured to be respectively mounted to a lower end of the support (30) and the slider (110), to be coupled to or separated from each other according to the ascent and descent of the support (30), and to be respectively connected with the power line (135), which is connected to the actuating unit of the headrest (20), and the power line (137), which is connected to the power supply unit of the vehicle via the seat main body (10).

MODE FOR THE INVENTION

The above and other objects, features and advantages of the present invention will be more clearly understood from the following detailed description. A preferred embodiment of the present invention is described in detail with reference to the accompanying drawings.

FIG. 2 is a perspective view showing an embodiment of a headrest apparatus according to the present invention, FIG. 3 is an exploded perspective view showing the headrest apparatus according to the present invention, shown in FIG. 2, and FIGS. 4 and 5 are views showing the operation of the headrest apparatus.

As shown in FIGS. 2 to 5, the headrest apparatus of the present invention includes a pair of coupling holders 40, which are mounted in respective side portions of the upper portion of a seat main body 10 for vehicles, a support 30, which is formed of a U-shaped pipe, which is configured such that two lower ends thereof are spaced apart from each other, the upper portion thereof is mounted in the headrest 20, and the two lower ends are inserted into respective coupling holders 40 so as to be moved, a connector body 100, which is fixedly mounted outside any one of the coupling holders 40 and is configured to have guide rails 101 that extend downwards from both sides of the connector body (100), a slider 110, which is coupled to the connector body 100 so as to be moved upwards and downwards along the guide rails 101, and female/male connectors 131 and 133, which are respectively mounted to the lower end of the support 30 and the slider 110 and are configured to be coupled to each other. A power line 135, which is disposed in the headrest 20, is connected to the connector 131 of the support 30. A power line 137, which is connected to the power supply unit of a vehicle via the seat main body 10, is connected to the connector 133 of the slider 110.

Engaging grooves 31 are formed at predetermined intervals in a portion of the support 30 that is inserted into a coupling holder 40. A stopper 33, which is hooked to the engaging grooves 31 and thus is moved inwards so as to apply fastening force thereto, is mounted to the upper portion of the coupling holder 40. These are implemented using a typical method, thus fastening the headrest 20 at a desired height.

Rollers 143 are mounted to two side portions of the connector body 100, and are configured such that the lower ends of the respective windup springs 141, which are wound to the rollers 143, are connected to the slider 110, and thus upward movement force, caused by the restoring force of the windup springs 141, is applied to the slider 110.

Respective locking holes 102 and respective latch holes 103 are formed in the guide rails 101 of the connector body 100. Latches 105, which are elastically moved by springs 107, are mounted in the respective latch holes 103. Each of the latches 105 has upper and lower inclined surfaces 105*a* and 105*b*, so that the slider (110) can be stopped or pass therethrough according to the magnitude of the force applied to the slider 110. In particular, the upper inclined surfaces 105*a* are formed to have a slope that is relatively close to horizontal, so that stronger stopping force can be provided when the slider 110, located at the upper position of the guide rails 101, is moved downwards.

A pair of lockers 120, which are coupled so as to be rotated, is provided in the slider 110. The lockers 120 have the shape of a backwards letter L, and are configured such that locking protrusions 121, which are inserted into the locking holes 102 when the slider 110 is located at the upper position of the guide rails 101, are formed in the respective upper ends of the lockers 120, and support protrusions 123, which come into contact with the connector 131 coupled to the lower end of the support 30, are formed at the respective opposite sides of the lockers. Furthermore, the lockers 120 are supported by respective springs 124 so that the locking protrusions 121 receive the force that is generated when the lockers 120 rotate in the outward direction thereof, that is, so that the support protrusions 123 receive the force that is generated when the lockers 120 rotate in the upward direction thereof.

A locking groove 131*a* is formed in the outer surface of the connector 131 of the support 30. A locking hook 111 is formed outside the slider 110 so that, when the connector 131 of the support 30 and the connector 133 of the slider 110 are connected to each other, the hook is elastically locked to the locking groove 131*a*, thus providing an appropriate locking force.

In the headrest apparatus of the present invention, which is constructed as described above, when the two ends of the support 30 are pushed and inserted into the coupling holders 40, the support 30 is locked at a predetermined location by the stopper 33, and thus mechanical coupling is achieved. At the same time, the connector 131 of the support 30 and the connector 133 of the slider 110 are connected to each other, and thus electrical coupling is achieved.

In greater detail, before the support 30 is coupled or before the support 30 is moved downwards after the coupling of the support 30, the slider 110 is located at the upper portion of the guide rails 101, as shown in FIG. 4. In this case, the locking protrusions 121 of the lockers 120 are inserted into the respective locking holes 102 of the guide rails 101, and thus the location of the slider 110 is fixed.

In this state, when the support 30 is pushed and thus moved downwards, the lockers 120 are rotated downwards, so that the locking protrusions 121 are released from the locking holes 102, with the result that the fastening force is removed and, thus, the slider 110 can be moved downwards by the support 30. In this case, in the early stage, in which force is applied, the slider 110 is hooked to the locking protrusions 121 and latches 105 and, thus, maintains a stopped state, so that the connector 131 of the support 30 and the connector 133 of the slider 110 are coupled to each other, and thus a connection between the two power lines 135 and 137 is made. Subsequently, when a downward force that is equal to or greater than a force having predetermined strength is applied, or when a force is applied for longer than a predetermined period of time, the latches 105 are pushed into the latch holes 103, so that the slider 110 is moved downwards, and thus the slider 110 can be lowered to the location shown in FIG. 5 along the guide rails 101. Accordingly, the headrest 20 can be freely moved to a desired location in the state in which the electrical connection is maintained.

In contrast, when it is desired to separate the headrest 20, the separation can be easily achieved in such a way that the support 30 is moved upwards by pushing the headrest 20 upwards. That is, when the slider 110 reached a predetermined height while being moved upwards along with the support 30, the locking protrusions 121 of the lockers 120 are inserted into the locking holes 102, and thus the slider 110 can be locked. Subsequently, when an increased force is applied, so that the support 30 is moved upwards, the connector 131 of the support 30 and the connector 133 of the slider 110 are separated from each other, and thus the support 30 can be released from the coupling holders 40. When the headrest 20 is coupled again after the above-described separation of the headrest 20, the re-coupling can be easily accomplished through the above-described process.

Accordingly, according to the headrest apparatus of the present invention, when the support 30 is merely pushed into or pulled out of the coupling holders 40 without a separate manipulation, the mechanical and electrical couplings of the headrest 20 to the seat main body 10 are easily and accurately made, with the result that the work of repairing and replacing actuating units, which are provided in respective headrests 20, as well as the assembly work when manufacturing vehicle seats, can be more easily and conveniently conducted.

Furthermore, in the state in which the headrest 20 is not coupled, the locking protrusions 121 of the lockers 120 are inserted into the respective locking holes 102, and thus the slider 110 is located at the upper position of guide rails 101 of the connector body 100, so that, when the support 30 is inserted into the coupling holders 40, the two connectors 131 and 133 can be accurately coupled to each other without being misaligned, with the result that, when the two connectors 131 and 133 are coupled to each other, the connector 131 of the support 30 is elastically supported by the support protrusions 123 of the lockers 120, and thus the impact that occurs when the coupling is made can be reduced. Accordingly, when the headrest 20 is coupled, the coupling between the two connectors 131 and 133 can be more easily and accurately achieved, and damage attributable to collision between the connectors 131 and 133 can be effectively prevented.

Furthermore, at the early stage of entry of the support 30, the slider 110 is stopped by the locking protrusions 121 and the elastically supported latches 105, so that the coupling between the two connectors 131 and 133 is made at the upper position of the guide rails 101, with the result that the work of coupling the headrest 20 can be more rapidly conducted and the impact that occurs when the connectors 131 and 133 are coupled to each other can also be more effectively prevented.

Furthermore, the slider 110 is supported by the rollers 143 and the windup springs 141 while receiving upward elastic force, so that, when the headrest 20 is coupled, the coupling between the two connectors 131 and 133 and the ascent and descent of the support 30 can be achieved more gently, and the separation of the headrest 20 can be facilitated.

The present invention is not limited to the above-described embodiment and the accompanying drawings, and it will be apparent to a person having ordinary knowledge in the technical field to which the present invention pertains that various substitutions, variations and modifications are possible within a range that does not depart from the technical spirit of the present invention.

INDUSTRIAL APPLICABILITY

According to the present invention, a connector is provided in a lower end of the support of the headrest, and an actuation type connector, which is connected to the connector, is provided in the seat main body, so that, when the support is merely inserted into or pulled out of the coupling holders of the seat main body, the head rest can be mechanically and electrically coupled to or separated from the seat main body in the same step, with the result that, in a process of manufacturing vehicle seats, in the headrests of which electrical actuating units are provided, the work of repairing and replacing actuating units, which are provided in a headrest, as well as the work of assembling headrests can be rapidly and conveniently conducted.

The invention claimed is:

1. A headrest apparatus for vehicle seats, comprising coupling holders (40) coupled to a seat main body (10) of a vehicle, a support (30) coupled to an upper portion of the seat main body (10) so as to be raised and lowered through the coupling holders (40), a headrest (20) coupled to an upper portion of the support (30), and an actuating unit provided in the headrest (20) and connected to a power supply unit of the vehicle via power lines to perform a predetermined function, wherein the headrest apparatus further comprises: a connector body (100) mounted outside any one of the coupling holders (40), and configured to have guide rails (101) that extend from the connector body (100) in an ascending and descending direction of the support (30); a slider (110) coupled to the connector body (100) so as to be moved along the guide rails (101); and connectors (131, 133) configured to be respectively mounted to a lower end of the support (30) and the slider (110), to be coupled to or separated from each other according to ascent and descent of the support (30), and to be respectively connected with the power line (135), which is connected to the actuating unit of the headrest (20), and the power line (137), which is connected to the power supply unit of the vehicle via the seat main body (10).

2. The headrest apparatus according to claim 1, further comprising: locking holes (102) respectively formed in guide rails (101) of the connector body (100); lockers (120) provided with respective locking protrusions (121), which are coupled in the slider (110) so as to be rotated and are inserted into the respective locking holes (102) according to a location of the slider (110), thus providing fastening force; and springs (124) configured to elastically support the respective lockers (120) such that the locking protrusions (121) are inserted into the locking holes (102).

3. The headrest apparatus according to claim 2, wherein the lockers (120) have respective support protrusions (123) that are configured to come into contact with and support the connector (131) of the support (30).

4. The headrest apparatus according to claim 1, further comprising: latch holes (103) respectively formed in the guide rails (101) of the connector body (100); and latches (105) mounted in the respective latch holes (103) so as to be elastically moved by springs (107), wherein each of the latches (105) has upper and lower inclined surfaces (105*a*, 105*b*) so that the slider (110) is stopped or pass therethrough using lifting force applied by the slider (110).

5. The headrest apparatus according to claim 4, wherein, of the inclined surfaces (105*a*, 105*b*) of each of the latches (105), the upward inclined surface (105*a*) is formed to have a slope close to horizontal, thus providing a relatively strong stopping force when the slider (110), which is positioned in an upper portion of the guide rails, is moved downwards.

6. The headrest apparatus according to claim 4, further comprising: rollers (143) mounted to the connector body (100); and windup springs (141) coupled with the rollers (143) to be wound thereto and configured such that lower ends thereof are connected to the slider (110); wherein upward movement force that is generated by the windup springs (141) is applied to the slider (110).

7. The headrest apparatus according to claim 4, further comprising: a locking groove (131*a*) formed in an outer surface of the connector (131) of the support (30); and a locking hook (111) hooked in the locking groove (131*a*) when the connectors (131, 133) are connected to the slider (110), thus providing locking force.

* * * * *